United States Patent [19]
Wagstaff

[11] Patent Number: 5,779,167
[45] Date of Patent: Jul. 14, 1998

[54] FORAGE HARVESTER KNIFE AND MOUNTING APPARATUS

[75] Inventor: Robert A. Wagstaff, Lancaster, Pa.

[73] Assignee: New Holland North America, Inc., New Holland, Pa.

[21] Appl. No.: 782,693

[22] Filed: Jan. 16, 1997

Related U.S. Application Data

[60] Provisional application No. 60/011,681 Feb. 15, 1996.

[51] Int. Cl.[6] .................................................. B02C 18/18
[52] U.S. Cl. ........................................ 241/242; 241/294
[58] Field of Search ................................ 241/221, 222, 241/242, 294

[56] References Cited

U.S. PATENT DOCUMENTS

| | | |
|---|---|---|
| 3,357,467 | 12/1967 | Morkoski . |
| 3,378,053 | 4/1968 | Potzsch . |
| 3,873,038 | 3/1975 | Wagstaff . |
| 3,958,766 | 5/1976 | Shriver . |
| 4,061,284 | 12/1977 | Raisbeck et al. . |
| 4,189,875 | 2/1980 | Flenniken . |
| 4,209,137 | 6/1980 | McAllister et al. . |
| 4,257,566 | 3/1981 | Lawrence . |

FOREIGN PATENT DOCUMENTS

| | | |
|---|---|---|
| 93543 | 5/1962 | Denmark . |
| 377124 | 7/1973 | U.S.S.R. . |

Primary Examiner—Mark Rosenbaum
Attorney, Agent, or Firm—Frank A. Seemer; Larry W. Miller; J. William Stader

[57] ABSTRACT

A rotatable forage harvester cutterhead having a shaft with a drum assembly coaxially secured to the shaft. A plurality of uniquely configured knives extend from the outer cylindrical surface of the drum, each with a cutting edge length less than half the axial length of the cylindrical surface. The knives are supported by assemblies having a solid mounting block secured to the outer cylindrical surface, which mounting blocks have a mounting surface extending at an acute angle to a radial plane extending from the shaft. Fasteners secure the knives to the mounting surfaces with the cutting edges of the knives extending in the direction of rotation of the cutterhead and generating a cylinder as the cutterhead rotates. The knife designs enhance efficiencies by providing a rake angle, formed by the bottom surface of the knife and the radial plane, that is greater than the acute angle.

6 Claims, 6 Drawing Sheets

FORAGE HARVESTER KNIFE AND MOUNTING APPARATUS

CROSS REFERENCE TO RELATED APPLICATION

This application claims the benefit of U.S. Provisional application Ser. No. 60/011,681, filed Feb. 15, 1996.

FIELD OF THE INVENTION

The present invention relates generally to forage harvesters and more particularly to a new knife design and associated knife mounting apparatus for a harvester cutterhead unit having a segmented knife configuration.

BACKGROUND OF THE INVENTION

A typical forage harvester operates in a field to process windrowed or standing forage crop and includes a mobile base unit that is either self propelled or pulled by a tractor. A header, attached to the base unit, either cuts standing crop material such as corn or picks up windrowed crop material such as hay and feeds such crop material rearwardly. The base unit includes a forwardly located generally rectangular inlet opening adjacent the header for receiving crop material from the attachment. A feeding assembly spans the width of the inlet opening for conveying material fed into the base unit to a cutting assembly that chops it into pieces appropriately sized for feeding to livestock. Also included on the base unit are means for transferring the chopped crop material to a vehicle that transports it from the field to a remote location where it is delivered to a storage facility, such as a silo.

Prior art cutting assemblies typically consist of a rotating cutterhead on which knives are mounted for travel through a cylindrical path, and a fixed knife mounted adjacent the path of the moving knives. The feeding assembly usually comprises one or more pairs of opposing counter-rotating rolls for feeding a mat of crop material across a flat face surface of the fixed knife, commonly referred to as a shear bar, operatively associated with cutting edges on the moving knives. The face surface is in an imaginary radial plane extending outwardly from the axis about which the cutterhead rotates to optimize the shearing action of the knives. As crop material is fed, it is chopped into lengths determined by the relationship of the feed rate of the feed rolls to the rotational speed of the cutterhead.

Figure 1:
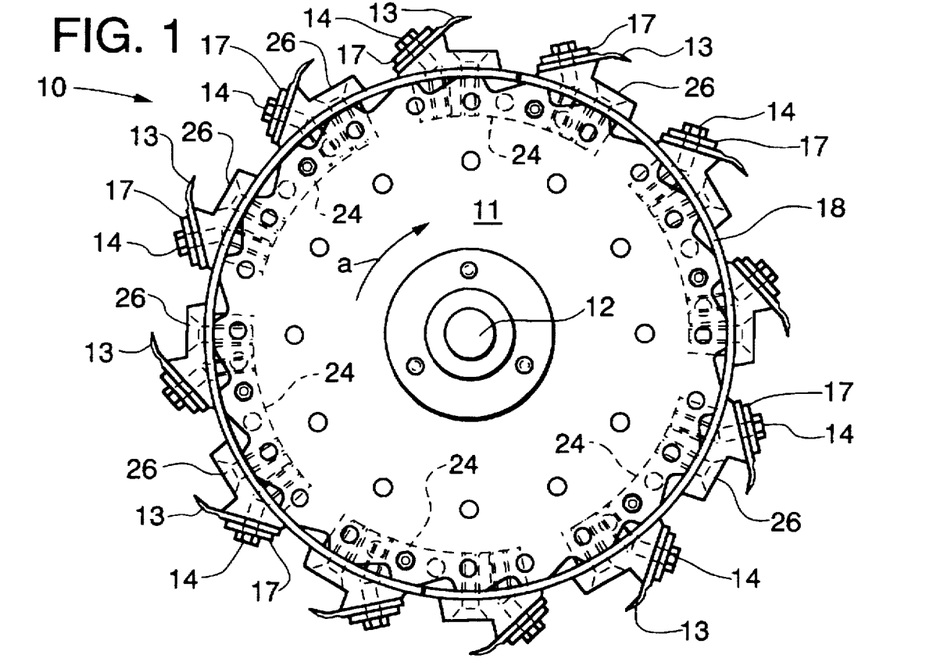
FIG. 1 is an end elevational view of a forage harvester cutterhead having segmented knives mounted on a drum.
Figure 2:
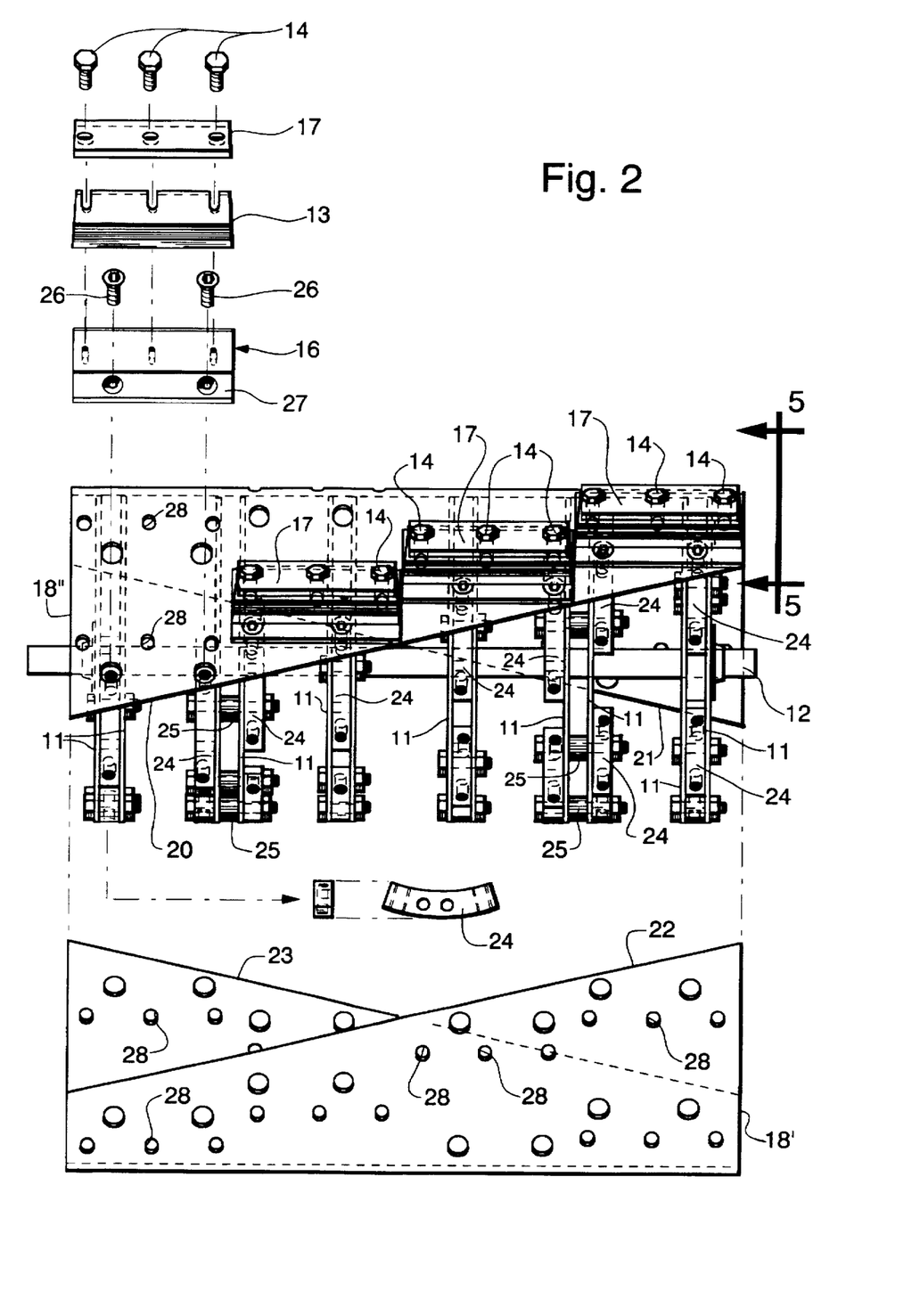
FIG. 2 is a diagrammatical top view of the forage harvester cutterhead shown in FIG. 1, and shows several parts in an exploded fashion.

One known type of cutterhead consists of a plurality of spiral knives mounted on a series of side by side axially spaced disc shaped members. Exemplary structure of this nature is shown in U.S. Pat. No. 4,209,137, issued Jun. 24, 1980 in the name of Ronald L. McAllister, et al. FIGS. 1 and 2 of this patent are identified as prior art and presented in this application as FIGS. 3 and 4. Other examples of prior art forage harvesters having spiral knives mounted via a plurality of spaced disc shaped plates are disclosed in U.S. Pat. Nos. 3,958,766, issued May 25, 1976 in the name of Joe E. Shriver, and No. 3,873,038, issued Mar. 25, 1975 in the name of Robert A. Wagstaff.

Another well known cutterhead design employs a segmented knife configuration mounted on a hollow cylindrical drum, an example of which is disclosed in U.S. Pat. No. 4,061,284, issued Dec. 6, 1977 in the name of Wesley Paul Raisbeck, et al. Another example of prior art showing a similar configuration is U.S. Pat. No. 4,189,875, issued Feb. 26, 1980 in the name of John H. Flenniken, in which a perspective view of a segmented knife arrangement mounted on a hollow cylindrical drum is shown at FIG. 2.

It should be noted that insofar as segmented are concerned, the simple flat segmented knife design contemplated in the cutterhead shown in U.S. Pat. No. 4,061,284, mentioned above, is not uncommon. However, various other knife designs are also known. For example, U.S. Pat. No. 4,257,566, issued Mar. 24, 1981 in the name of Allan K. Lawrence, Danish Patent No. 93,543, issued May 28, 1962, and Russian Patent No. 377,124 issued in 1973, disclose bent knife designs used in both segmented and spiral configurations. Another knife design, a curved shape, is shown in U.S. Pat. No. 3,357,467, issued Dec. 12, 1967 in the name of James Morkoski, and No. 3,378,053, issued Apr. 16, 1968 in the name of Wolfgang R. Potsch.

In segmented knife cutterheads, as in all forage harvester cutterheads, the rake angle of the knives is an important design consideration, i.e., the acute angle of the knife relative to crop material being fed across the shear bar. It is desirable to have this angle, which is inclined with respect to the imaginary radial plane mentioned above, maximized to reduce cutting energy, and thus improve efficiency. When flat knives are employed, the incline with respect to the tip path is dictated by the distance of radial protrusion of the knife clamping means, as illustrated by the clamping bolts in the cutterhead shown in U.S. Pat. No. 4,061,284. The clamping means must not protrude beyond the cylinder generated by the path of the knife tips, as is also apparent from the spiral design shown in U.S. Pat. No. 3,873,038.

Figure 8:
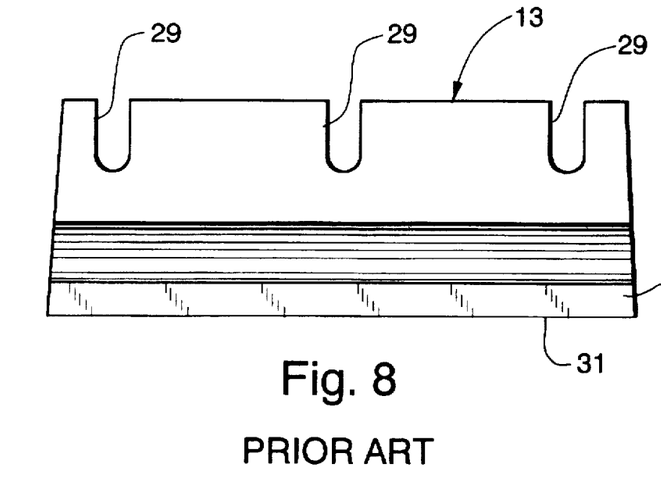
FIG. 8 is a plan view of a prior art knife design.
Figure 9:
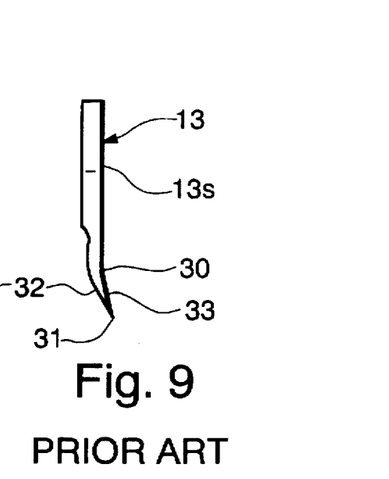
FIG. 9 is an end elevational view of the prior art knife shown in FIG. 8.

U.S. Pat. No. 4,257,566, mentioned above as one example of bent knives, is illustrative of an attempt in the prior art to provide an effective rake angle in a segmented cutterhead in which the knife assemblies are mounted on a drum. Each knife is bent such that the cutting edge is directed radially inward relative to the cylinder generated by such cutting edge. This improves efficiency and provides clearance for the clamping means, which in this case is a series of cap screws along a plate. A similar prior art bent knife design is shown in detail in FIGS. 8 and 9 of the following specification, wherein a portion of the flat bar from which the bent knife is formed is milled away to reduce the thickness prior to bending.

SUMMARY OF THE INVENTION

An important object of the present invention is to provide an improved segmented knife design for a forage harvester cutterhead that lends itself to simple manufacturing techniques without reducing the efficiency of the cutterhead.

Another important object is to provide a durable segmented forage harvester knife assembly for mounting on a rotatable cutterhead drum.

Still another important object is to provide alternate segmented knife designs for forage harvester cutterheads that provide rake angles that enhance efficiencies.

In pursuance of these and other important objects the present invention in one instance contemplates a rotatable forage harvester cutterhead comprising a shaft, a drum assembly having an outer cylindrical surface, means for coaxially securing the drum assembly to the shaft, and a plurality of knives, each of which has a cutting edge length less than half the axial length of the drum assembly. More particularly, the invention in this instance contemplates, a plurality of knife support assemblies each of which comprises a solid mounting block detachably secured to the outer cylindrical surface of the drum assembly, the mounting block having a flat mounting surface extending at an acute angle to a radial plane extending from the shaft. The support assemblies further comprise fastener means for securing a knife to the flat mounting surface of the mounting block with the cutting edge extending in the direction of rotation of the cutterhead and generating a cylinder as the cutterhead rotates, the cylinder having a diameter larger than the diameter of the drum, and the knife having a top surface and a bottom surface whereby the rake angle formed by the bottom surface of the knife and the radial plane is greater than the acute angle.

The foregoing instance, as well as other instances contemplated, and other objects, features and advantages of the invention will appear more fully hereinafter from a consideration of the detailed description which follows, in conjunction with the accompanying sheets of drawings wherein principal and alternative embodiments of the invention are illustrated by way of example. It is to be expressly understood, however, that the drawings are for illustrative purposes and are not to be construed as defining the limits of the invention.

DESCRIPTION OF THE PREFERRED EMBODIMENT

Figure 3:
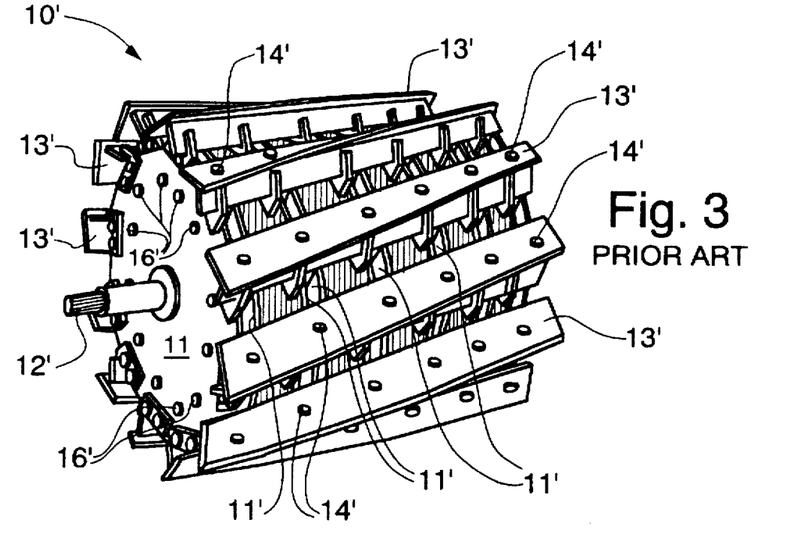
FIG. 3 is a perspective view of a prior art forage harvester cutterhead.
Figure 4:
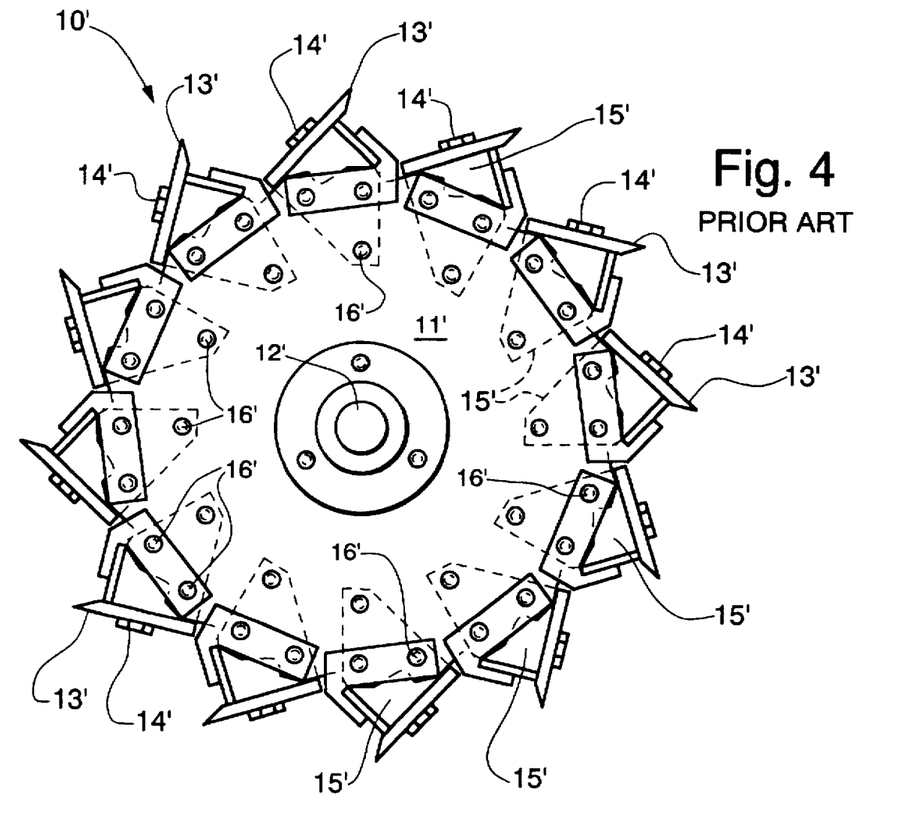
FIG. 4 is an end elevational view of the prior art forage harvester cutterhead shown in FIG. 3.

Referring now to the drawings for a more detailed description of the present invention, FIG. 1 shows the end view of a forage harvester cutterhead, generally designated by reference numeral 10, in which the present invention is embodied. In FIG. 2 a front view of cutterhead 10 is shown in which key parts are depicted in exploded fashion to illustrate the unique manner in which a prior art spiral knife cutterhead is converted to a segmented knife cutterhead. To this end, FIGS. 3 and 4 show a typical prior art spiral knife cutterhead 10' of the type shown in above mentioned U.S. Pat. No. 4,209,137, hereby incorporated by reference.

Cutterhead 10' comprises a plurality of disc shaped plate members 11' positioned in axially spaced relationship to each other along a central shaft 12'. Plate members 11' are mounted on shaft 12' by any suitable means such as, for example, splines and keys. Pairs of plate members 11' are equally spaced along the shaft. A plurality of spirally shaped knives 13' are secured outwardly of plate members 11' by clamping bolts 14' screwed into tapped holes in mounting blocks 15' which are affixed to members 11' via bolts 16'.

Figure 6:
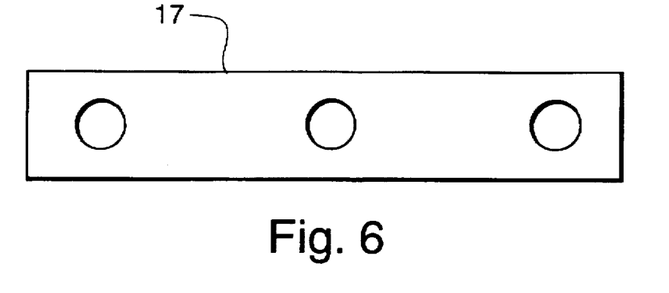
FIG. 6 is a plan view of a clamping plate, one each of which is used with each knife.
Figure 7:
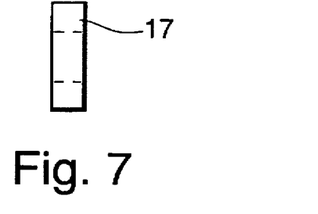
FIG. 7 is an end elevational view of the clamping plate shown in FIG. 6.
Figure 10:
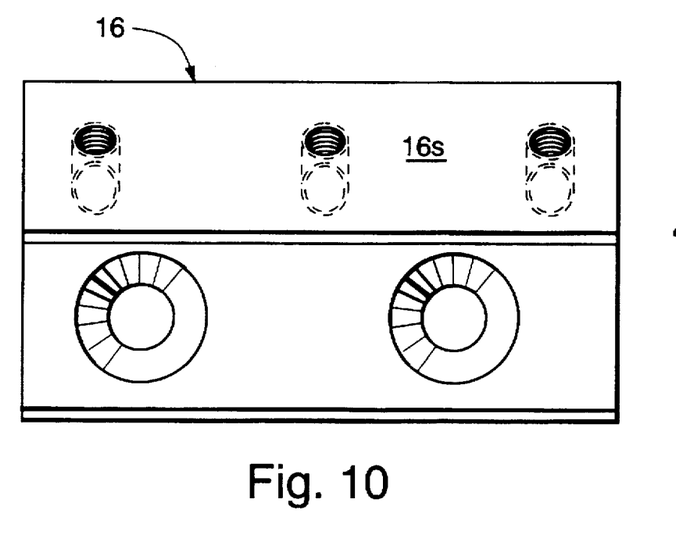
FIG. 10 is a plan view of a knife support block, one each of which is used in conjunction with a clamping plate to hold each knife in place.
Figure 11:
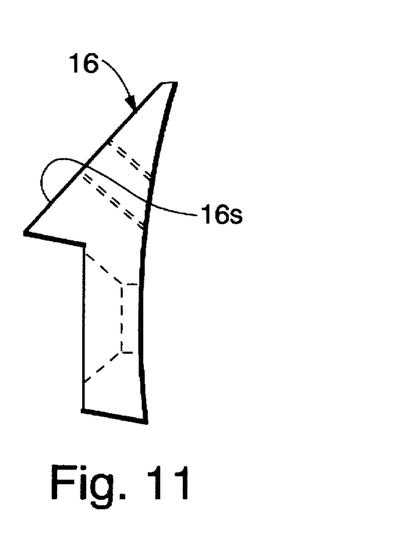
FIG. 11 is an end elevational view of the knife support block shown in FIG. 10.

Turning now to FIG. 2, six pairs of disc shaped plate members 11 are positioned in axially spaced relationship to each other along a central shaft 12. Plate members 11 are equally spaced along shaft 12 in the same manner as the plates and shaft of the prior art cutterhead depicted in FIGS. 3 and 4. A plurality of segmented knives 13 are secured outwardly of plate members 11 by clamping bolts 14 screwed into tapped holes in knife support blocks 16, one of which is shown in FIGS. 10 and 11. A knife clamping plate 17, shown separately in FIGS. 6 and 7, completes the knife support assembly.

A drum 18, interposed between the knife support assemblies and disc shaped plate members 11, comprises a first drum section 18' and a second drum section 18", which when assembled form a cylindrical drum having an inner diameter substantially the same as the diameters of disc shaped plate members 11. When drum sections 18' and 18" are assembled, transverse edge surfaces 20, 21 and 22, 23, respectively, are adjacently diametrically disposed.

Figure 5:
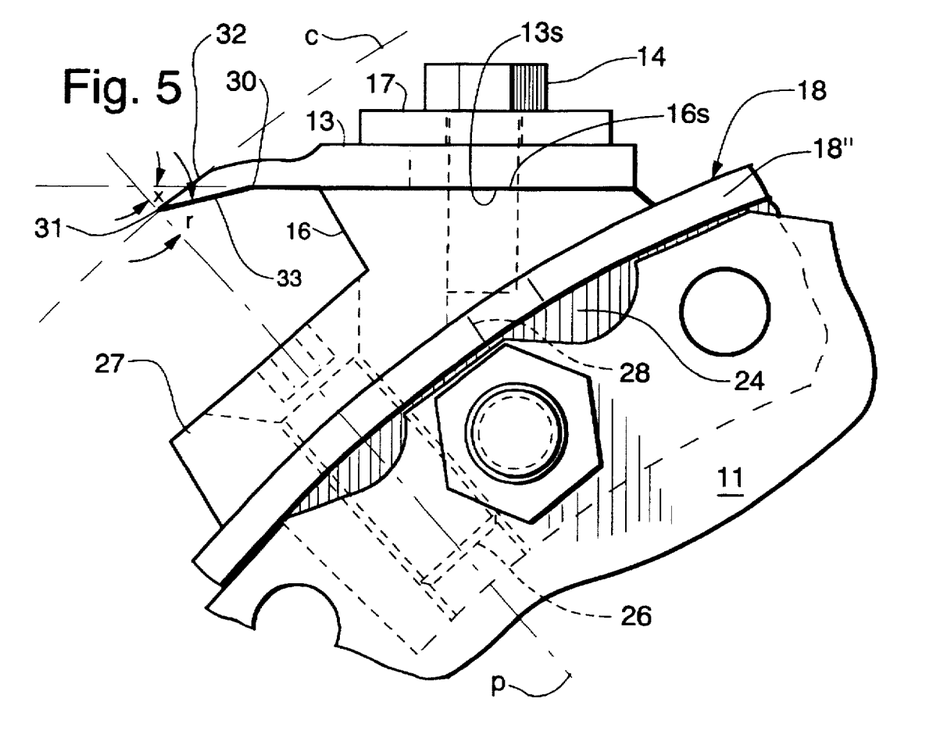
FIG. 5 is a view taken in the direction of arrows 5—5 in FIG. 2 showing a fragmentary enlargement of a portion of the cutterhead of FIG. 2.

A plurality of arcuately shaped mounting blocks 24 are bolted to the outer edges of plate members 11 with the outer curved surfaces of the blocks extending past the outer edges of plate members 11, as shown in FIG. 5. These mounting blocks are mounted between the paired plates in four instances, while in the other two sets, the second innermost from each side, the blocks are mounted outwardly of the plates with spacers 25 between the plates aligned with the blocks. As also shown in FIG. 5, the entire cutterhead arrangement is secured together by screws 26 which pass through flange portion 27 of knife support blocks 16 and drum 18, and are snugly secured in tapped holes in mounting blocks 24. Each knife support block 16 is attached to two laterally adjacent mounting blocks, and each mounting block receives screws from two circumferentially adjacent knives. In the adjacent edge area of the drum sections, a mounting block 24 spans from one section to the other and receives screws from two circumferentially adjacent knife support blocks 16. No knife support blocks are mounted across the juncture between the edges, which due to tolerances may be slightly uneven. This enables the knifes to be precisely mounted thereby enhancing the sharpening function of their cutting edges which travel in a common cylindrical path. It should also be noted with respect to drum 18 that a series of small holes 28 provide relief for knife clamping bolts 14 (see FIG. 5).

Although knife 13, adjustably mounted via slots 29 in a well known manner, is shown as having a bent configuration, other designs, such as the straight knife shown in U.S. Pat. No. 4,061,284, mentioned above, can also be employed. More particularly, knife 13 is bent at bend 30 along a line generally parallel to cutting edge 31 (see FIGS. 5, 8 and 9). A bent knife design of this general type is well known in the prior art, as illustrated by U.S. Pat. No. 4,257,566, also mentioned above, hereby incorporated by reference. By further reference to the prior art disclosure of U.S. Pat. No. 4,061,284, mentioned above, it is clear that it is well known to the skilled artisan that segmented knife configurations include rows of knives arranged in a side by side fashion over the full surface of a drum with adjacent knives offset along spiral paths. The present invention accommodates segmented knives in this configuration, as shown in the drawings, but is adaptable to accommodate any other configuration that results in a cylindrical knife path.

In operation, the cutterhead comprises an integral part of a forage harvester and is rotated by the power source of the harvester in direction "a" (see FIG. 1) whereupon the cutting edges of the knives generate a cylinder (designated by reference letter "c" in FIG. 5) corresponding to the path of the knives in a well known manner. This path brings the cutting edges of the knives in contact with crop material being fed across an associated fixed shear bar (not shown), disposed with its face surface in an imaginary radial plane, designated by reference letter "p" (see FIG. 5).

Thus, under conditions where cutterhead 10 is rotated in direction "a" the cutting edges of the knives, regardless of design, generate cylinder "c" corresponding to the path of the tips of the knives. The cutting edge is defined by beveled edge 32 and the adjacent area 33 (see FIG. 9) of the bottom surface of knife 13. This knife path maintains a rake angle "r" as the knives are rotated into contact with crop material being fed across the above mentioned associated fixed shear bar (not shown). As shown with respect to the bent knife design shown in FIG. 5, rake angle "r" is the angle between bottom surface 33 of knife 13 and imaginary plane "p". The rake angle is greater than angle "x", the angle between imaginary plane "p" and the coplanar extension of the flat surface bottom portion 13s of knife 13, and thereby reduces the area of impact of the knife on the material being chopped. This improves the efficiency of the bent knife design relative to a flat knife, which is a well known feature of the bent knife design.

Figure 12:
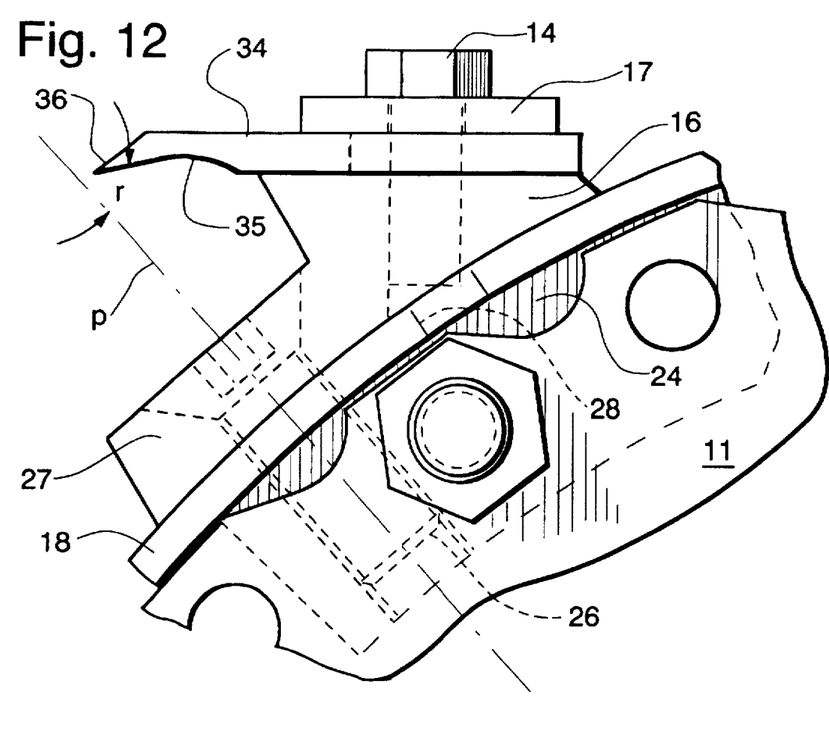
FIG. 12 is a view similar to FIG. 5 showing a fragmentary enlargement of a portion of the cutterhead shown in FIGS. 1 and 2 in which the unique knife design of the present invention is incorporated.
Figure 13:
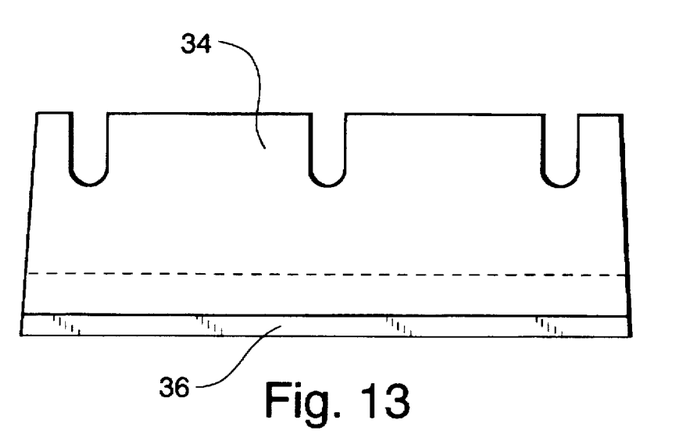
FIG. 13 is a plan view of the knife design shown in FIG. 12.
Figure 14:
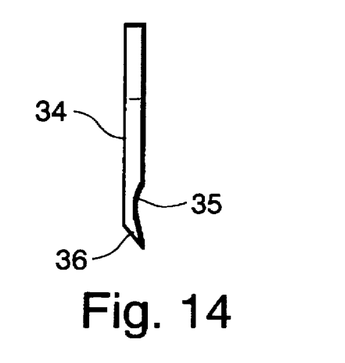
FIG. 14 is an end elevational view of the knife shown in FIG. 13.
Figure 15:
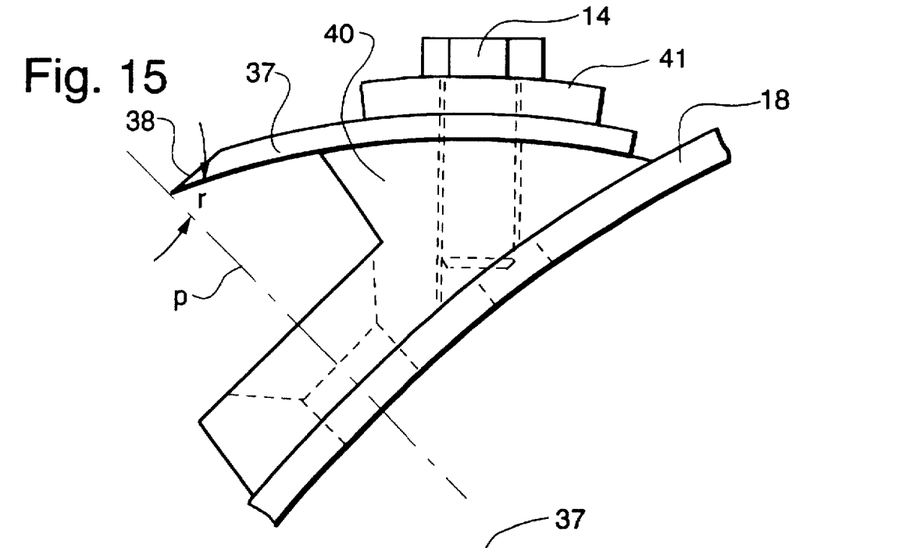
FIG. 15 is a view similar to FIG. 5 showing a fragmentary enlargement of a portion of the cutterhead shown in FIGS. 1 and 2 in which an alternative embodiment of the unique knife design of the present invention is incorporated.
Figure 16:
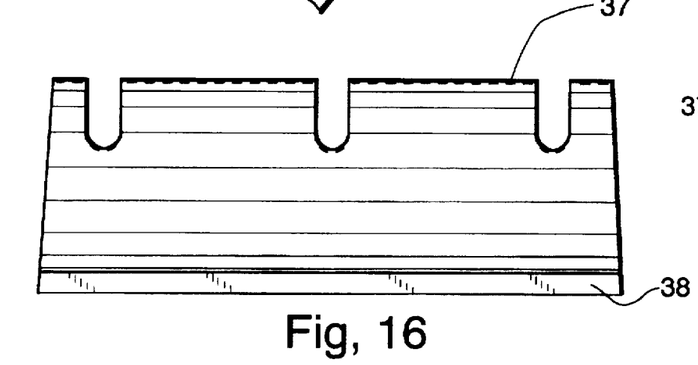
FIG. 16 is a plan view of the knife design shown in FIG. 15.
Figure 17:
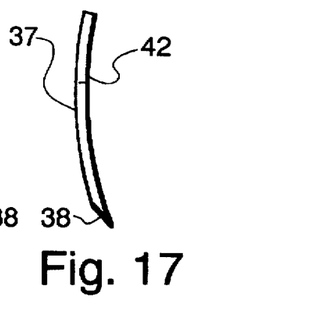
FIG. 17 is an end elevational view of the knife shown in FIG. 16.
Figure 18:
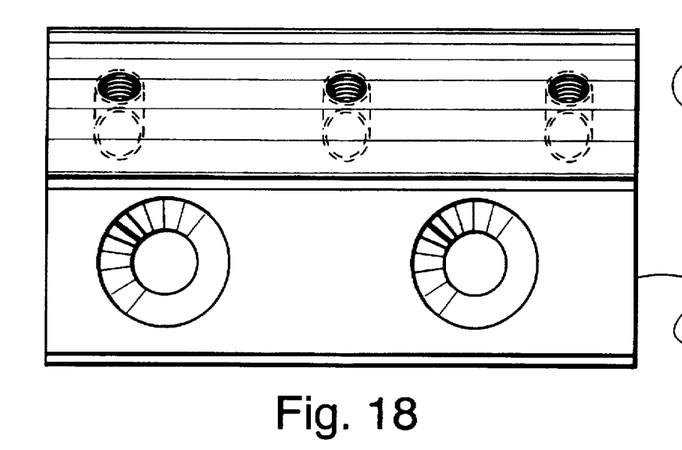
FIG. 18 is a plan view of a modified knife support block, one each of which is used with a modified clamping plate to hold the alternative knives in place, as shown in FIG. 15.
Figure 19:
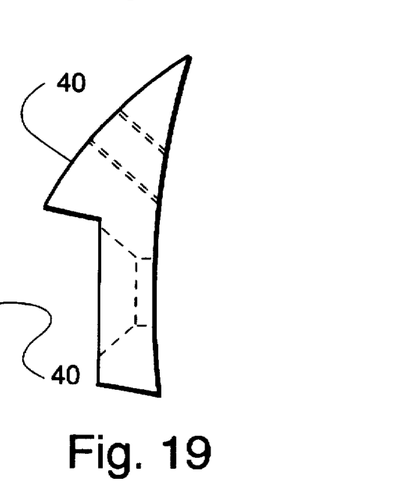
FIG. 19 is an end elevational view of the knife support block shown in FIG. 18.

Now turning to knife 34 illustrated in FIGS. 12, 13 and 14, a unique design is provided by machining a flat knife with a relief portion 35 to provide the same desired rake angle "r" without necessitating a bend of the type shown in prior art knife 17, depicted in FIGS. 5 through 9. In knife 34, the cutting edge is also defined by a beveled potion 36, which provides for similar ease in sharpening as the bent knife design, but obviates the need for a bending operation during formation. In this knife assembly, as in the case of the assembly shown in FIG. 5., clamping bolts 14 do not project beyond the cylindrical path of the knife tips, which is the same as path "c" shown in FIG. 5.

FIGS. 15 through 19 show another knife 37 having a curved configuration which enables rake angle "r" to be attained without necessitating a bending step during fabrication. The body of knife 37 is curved and has a constant thickness, except for beveled edge 38. Curved knife 37 is supported via a block 40 and clamping plate 41 on drum 18 by clamping bolts 14 to provide the same rake angle "r" as provided by the arrangement shown in associated FIGS. 5 and 12. A secure mounting is achieved by providing a radius of curvature on the bottom surface 42 of curved knife 37 that is slightly less than the radius of the corresponding surface of support block 40. Likewise, the radius of curvature of the corresponding surface on clamping plate 41 is slightly less than the curvature of the top surface of the knife 37.

Of the many implicit and explicit advantages of the present invention one of the most important is the provision of a unique knife assembly for a forage harvester cutterhead having a rotary drum configuration. Also important is the provision of a knife designed to enhance efficiencies of the cutterhead which thereby improves overall operation and customer satisfaction. In the two principle configurations of the knife design, the manufacturing process is simplified and thereby provides additional important advantages.

While preferred structure in which the principles of various embodiments of the present invention are shown and described above, it is to be understood that the invention is not limited to such structure, but that, in fact, widely different means of varying scope and configuration may be employed in the practice of the invention.

Having thus described the invention, what is claimed is:

1. In a rotatable forage harvester cutterhead comprising a shaft, a drum assembly having an outer cylindrical surface, means for coaxially securing said drum assembly to said shaft, and a plurality of knives, each of which has a cutting edge length less than half the axial length of said drum assembly, the improvement comprising a plurality of knife support assemblies each of which comprises a solid mounting block detachably secured to said outer cylindrical surface of said drum assembly, said mounting block having a flat mounting surface extending at an acute angle to a radial plane extending from said shaft, fastener means for securing a knife to said flat mounting surface of said mounting block with the cutting edge extending in the direction of rotation of said cutterhead and generating a cylinder as the cutterhead rotates, said cylinder having a diameter larger than the diameter of the outer cylindrical surface of said drum assembly, said knife having a top surface and a bottom surface whereby the rake angle formed by said bottom surface of said knife and said radial plane is greater than said acute angle, said bottom surface of said knife includes an inner flat portion adjacent and coplanar with said mounting surface of said mounting block, and an outer portion terminating in said cutting edge, said top surface of said knife includes a beveled surface adjacent said cutting edge, and said outer portion of said bottom surface of said knife is arcuately shaped from said cutting edge to a line parallel to said cutting edge, said line being contiguous with said inner portion of said bottom surface of said knife.

2. In a rotatable forage harvester cutterhead as set forth in claim 1 wherein said top surface of said knife includes a flat portion that extends rearwardly from said beveled surface.

3. In a rotatable forage harvester cutterhead as set forth in claim 2 wherein said fastener means include outer portions that extend outwardly from said flat portion of said top surface of said knife, said outer portions of said fasteners projecting within the confines of said cylinder.

4. A rotatable forage harvester cutterhead comprising a rotatable shaft, a plurality of axially spaced disc shaped plate members having substantially the same diameters and affixed in parallel planes transversely along said shaft for rotation therewith, a plurality of mounting members detachably secured to said plate members, a drum having an inner surface having a diameter at least as great as the diameters of said disc shaped plate members, attachment means for securing said drum to said mounting members, a plurality of substantially flat knives, each knife having a cutting edge extending in a transverse direction less than half the axial length of said drum, a plurality of knife support assemblies each of which comprises a solid mounting block secured to said outer cylindrical surface of said drum assembly, said mounting block having a flat mounting surface extending at an acute angle to a radial plane extending from said shaft perpendicular to said plate members, fastener means for securing a knife to said flat mounting surface of said mounting block with the cutting edge extending in the direction of rotation of said cutterhead and generating a cylinder as the cutterhead rotates, said cylinder having a diameter larger than the diameter of said drum, said knife having a top surface and a bottom surface whereby the rake angle formed by said bottom surface of said knife and said radial plane is greater than said acute angle, said bottom surface of said knife includes an inner flat portion adjacent and coplanar with said mounting surface of said mounting block, and an outer portion terminating in said cutting edge, said top surface of said knife includes a beveled surface adjacent said cutting edge, and said outer portion of said bottom surface of said knife is arcuately shaped from said cutting edge to a line parallel to said cutting edge, said line being contiguous with said inner portion of said bottom surface of said knife.

5. In a rotatable forage harvester cutterhead as set forth in claim 4 wherein said top surface of said knife includes a flat portion that extends rearwardly from said beveled surface.

6. In a rotatable forage harvester cutterhead as set forth in claim 5 wherein said fastener means include outer portions that extend outwardly from said flat portion of said top surface of said knife, said outer portions of said fasteners projecting within the confines of said cylinder.

* * * * *